United States Patent [19]
Muterspaugh

[11] Patent Number: 6,166,703
[45] Date of Patent: Dec. 26, 2000

[54] COMBINATION SATELLITE AND VHF/UHF RECEIVING ANTENNA

[75] Inventor: Max Ward Muterspaugh, Indianapolis, Ind.

[73] Assignee: Thomson Licensing S.A., Boulogne Cedex, France

[21] Appl. No.: 09/117,485
[22] PCT Filed: Feb. 27, 1997
[86] PCT No.: PCT/US97/03041
    § 371 Date: Jul. 30, 1998
    § 102(e) Date: Jul. 30, 1998
[87] PCT Pub. No.: WO97/32360
    PCT Pub. Date: Sep. 4, 1997

Related U.S. Application Data

[60] Provisional application No. 60/012,340, Feb. 27, 1996.

[30] Foreign Application Priority Data

Mar. 7, 1996 [GB] United Kingdom ............ 9604847

[51] Int. Cl.[7] .................................................. H01Q 19/12
[52] U.S. Cl. ................... 343/840; 343/727; 343/700 MS
[58] Field of Search ........................... 343/725, 727, 343/840, 781 R, 756, 700 MS

[56] References Cited

U.S. PATENT DOCUMENTS

| 4,348,677 | 9/1982 | Salmond ........................ 343/729 |
| 4,400,701 | 8/1983 | Dupressoir ..................... 343/725 |
| 5,451,969 | 9/1995 | Toth et al. ..................... 343/781 CA |

Primary Examiner—Tan Ho
Attorney, Agent, or Firm—Joseph S. Tripoli; Robert D. Shedd; Kuniyuki Akiyama

[57] ABSTRACT

A single antenna assembly receives both direct broadcast satellite signals (DBS) and terrestrial broadcast signals, such as local VHF and UHF television channel broadcasts. The assembly includes an electromagnetic signal reflector for reflecting and focusing electromagnetic signals in a first band of frequencies, such as microwave signals for DBS. Incorporated in the reflector is an antenna for receiving electromagnetic signals in a second band of frequencies.

10 Claims, 13 Drawing Sheets

COMBINATION SATELLITE AND VHF/UHF RECEIVING ANTENNA

This application claims benefit of Provisional Appl. 60/012,340 filed Feb. 27, 1996.

FIELD OF THE INVENTION

The present invention concerns antennas for receiving broadcast signals such as television signals.

BACKGROUND

Direct broadcast satellite (DBS) service has been established recently in the U.S. DBS provides television programming, movies and other video and audio services to users nationwide without requiring connection to a cable service. In addition to subscribing to a DBS service, such as DirecTV® from Hughes, Primestar, and Echostar, receiving DBS typically involves obtaining a receiver, such as the DSS® receiver manufactured by Thomson Consumer Electronics, Inc. of Indianapolis, Ind., and installing a suitable antenna system, such as the 18" reflector antenna included with the DSS® system.

One problem associated with DBS is that local broadcast services such as television programming provided by local VHF/UHF broadcast stations may not be available via a DBS service. A simple solution to this problem is to install a separate antenna assembly suitable for receiving local broadcast signals. An example of a separate antenna assembly suitable for receiving local broadcast signals is the Freedom Antenna® manufactured by Antennas America, Inc. The Freedom Antenna® conforms to the back of a dish-shaped DBS antenna and is installed using the hardware associated with the dish reflector. However, adding another antenna assembly to a DBS system to receive local broadcast signals undesirably requires additional equipment, additional installation effort, and added cost.

Even if a second antenna assembly such as the Freedom Antenna® is used, broadcast signal reception from the second antenna assembly may be poor. Specifically, because a DBS antenna is typically fixed in a position that aims at a particular satellite location, a second antenna assembly mounted with the DBS antenna also has a fixed position. The fixed position, or orientation, of the second antenna assembly with respect to the broadcast signal source may not provide optimum broadcast signal reception.

Therefore, a need exists for an antenna arrangement that provides acceptable reception of both DBS and local broadcast signals.

SUMMARY OF THE INVENTION

The present invention solves the described problem by providing an antenna comprising a reflector for reflecting and focusing electromagnetic signals in a first band of frequencies and means incorporated with the reflector for receiving electromagnetic signals in a second band of frequencies.

BRIEF DESCRIPTION OF THE DRAWING

The invention may be better understood by referring to the enclosed drawing in which:

FIG. 9-a illustrates another embodiment of a dual-purpose antenna for receiving satellite and local broadcast signals;

FIG. 9-b illustrates, in schematic diagram form, high-pass filters shown in FIG. 9-a;

FIG. 11-a illustrates an embodiment of the reflector of the antenna system shown in FIG. 10; and 10 FIG. 11-b illustrates an aspect of the reflector embodiment shown in FIG. 11-a.

In the various Figures, the same or similar elements shown are identified by the same reference numbers.

DETAILED DESCRIPTION

Figure 1:
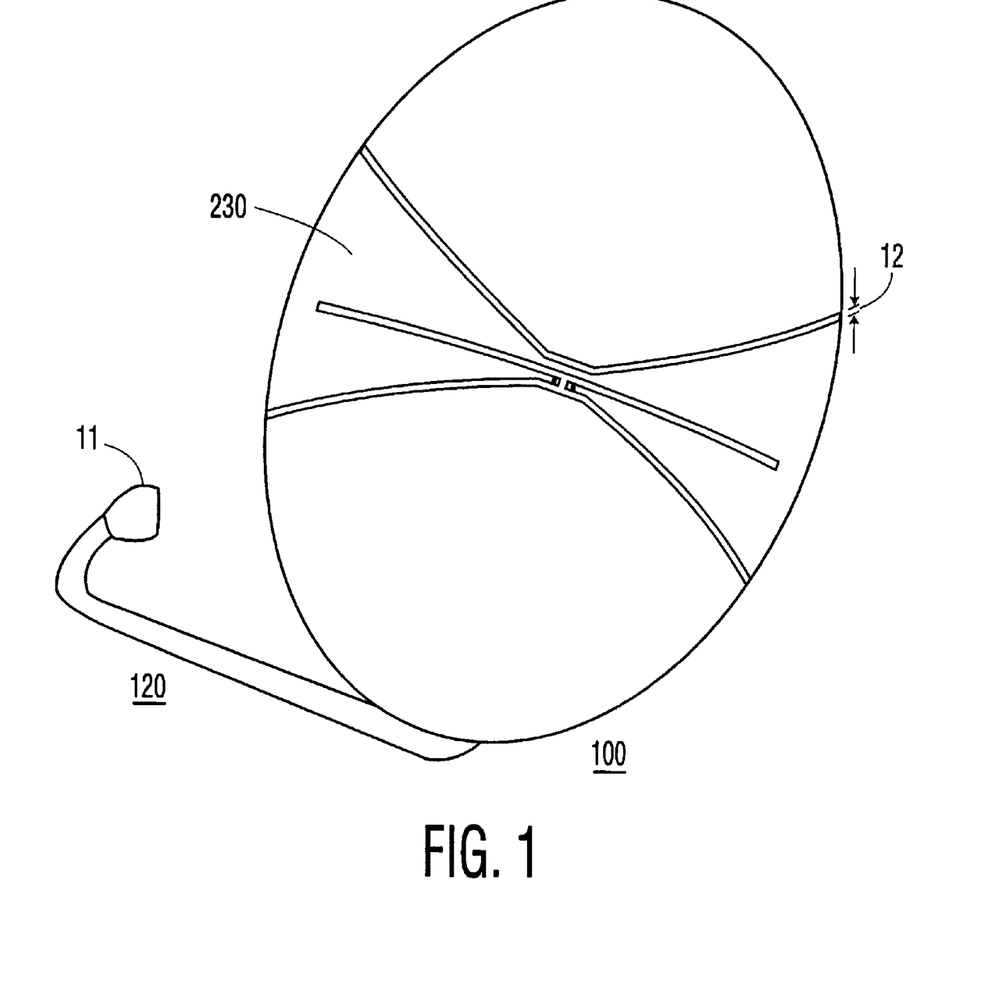
FIG. 1 illustrates an embodiment of a dual-purpose antenna for receiving satellite and local broadcast signals.

FIG. 1 shows a dish-shaped antenna for receiving signals in a first frequency band, e.g., microwave direct broadcast satellite (DBS) signals, that has been modified to also receive signals in another frequency band, e.g., VHF and UHF signals from terrestrial broadcast stations. The dual-purpose antenna shown in FIG. 1 includes dish-shaped reflector 100, frequency converter 11, and frequency converter support arm 120. Frequency converter 11 may be, for example, a conventional low noise block converter (LNB). Dish-shaped reflector 100 reflects and focuses microwave broadcast signals transmitted from a direct broadcast satellite (DBS). Converter support arm 120 positions frequency converter 11 at the focal point of the reflected microwave signals.

These dish-shaped reflectors can be manufactured using a so-called "injection molding" process. In this process, in order to form a microwave reflector, a conductive metallic paint (e.g., nickel or copper paint) is applied to the front surface of a dish-shaped member, which is normally made of a light-weight insulating material (e.g., plastic or fiberglass). In accordance with principles of the invention, a reflector for receiving DBS signals also includes an antenna element for receiving VHF/UHF band signals. For dish shaped reflectors produced using injection molding, an antenna element for receiving VHF/UHF band signals is formed on the surface of the dish-shaped member by masking the conductive paint as described in detail below. It has been determined experimentally that incorporating a VHF/UHF antenna element with a dish reflector as described below does not degrade the relative function of the microwave reflector.

The process of forming the VHF/UHF antenna elements on the surface of the dish-shaped member includes removing the conductive paint to produce fine border lines 12 in FIG. 1. These border lines separate the VHF/UHF antenna pattern from the rest of the conductive material. As predicted by theory and verified by experiments, such fine lines do not negatively affect the overall performance of the reflector so long as their width is kept approximately one-tenth (or less) of the wavelength of microwave broadcast signals. As a reference, see Johnson, Richard C. and Jasik, Henry, "The Paraboloidal Grid Reflector," in *Antenna Applications Reference Guide*, (McGraw Hill, 1987).

For example, as to RCA digital satellite service (DSS) available in the U.S., the broadcast signals are transmitted between 12.2 and 12.7 GHz (the K4 part of the Ku-band). Accordingly, the allowable line width would be approximately one-tenth inch (2.5 mm) or less. However, experiments have proven that microwave reception is not degraded so long as the line width is less than one-eighth inch (3.0 mm).

Figure 2A:
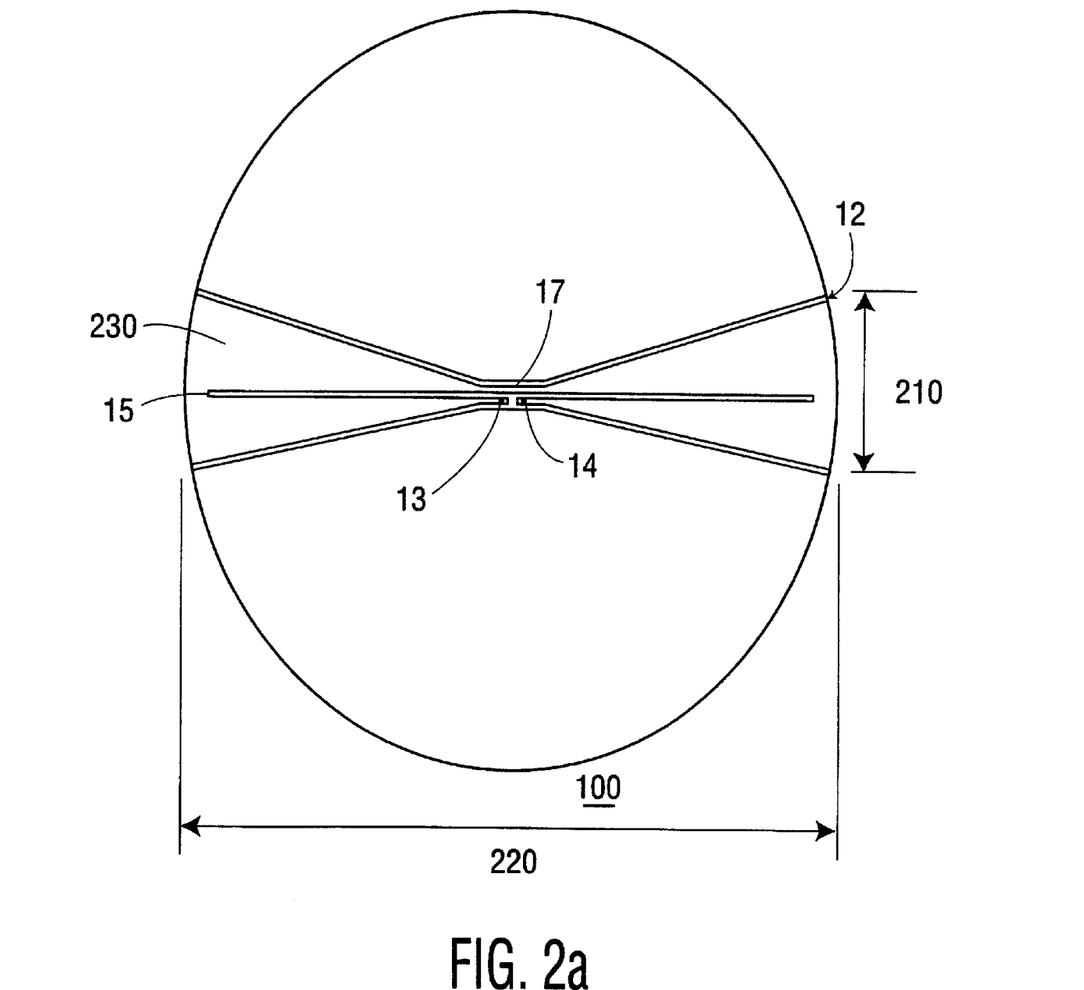
FIGS. 2a–2d illustrates an embodiment of the dish-shaped reflector of the antenna shown in FIG. 1.
Figure 2B:
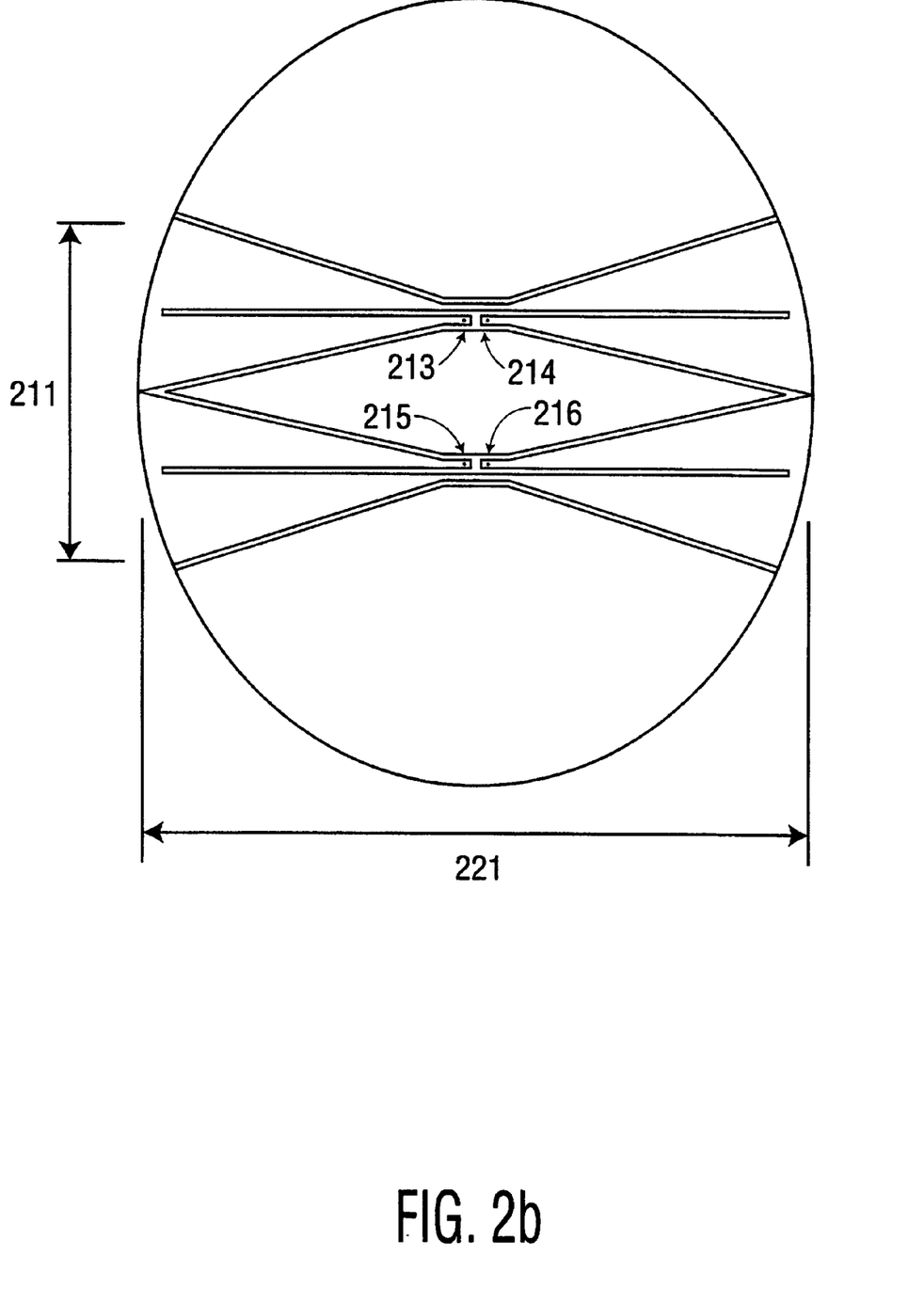
Figure 2C:
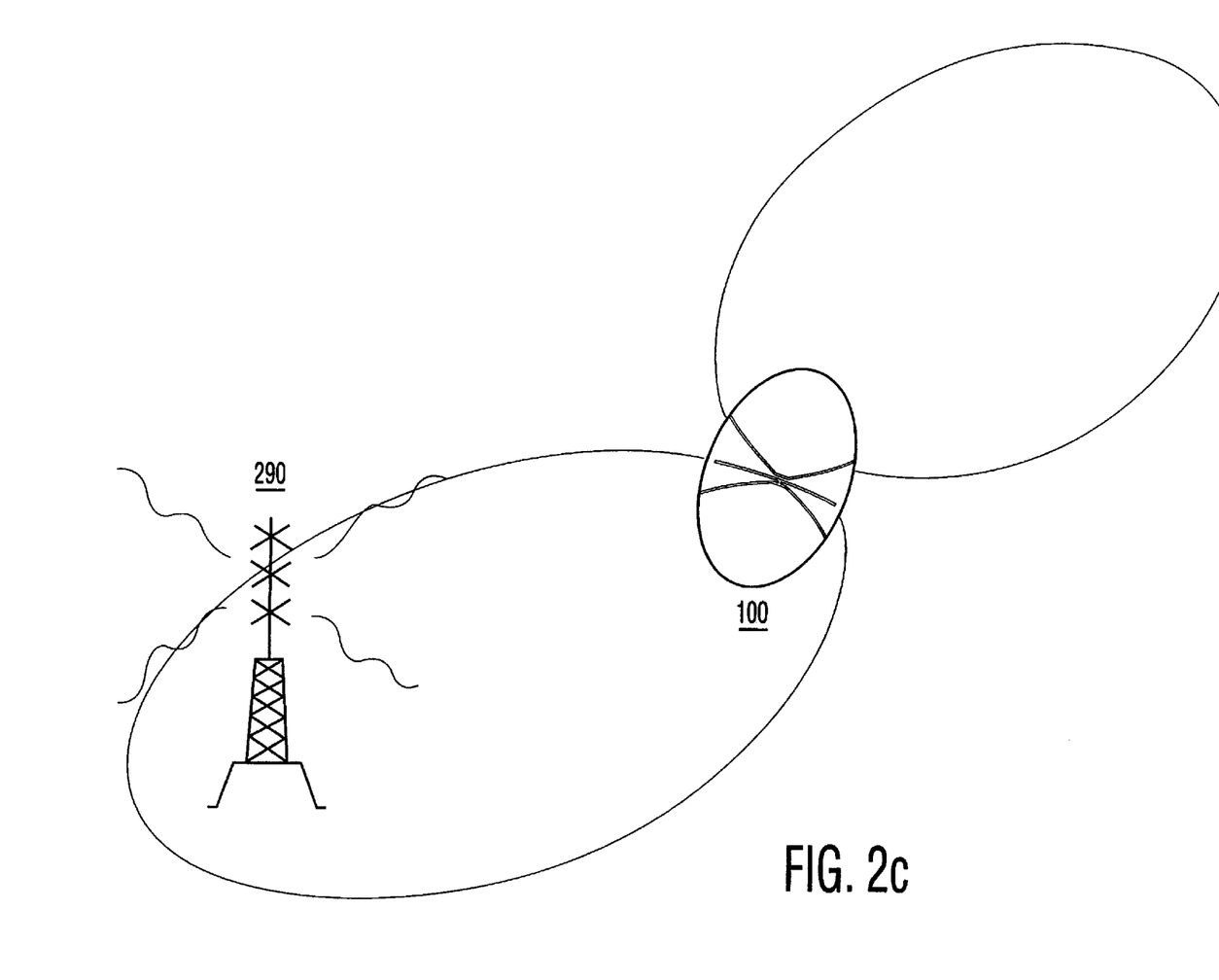
Figure 2D:
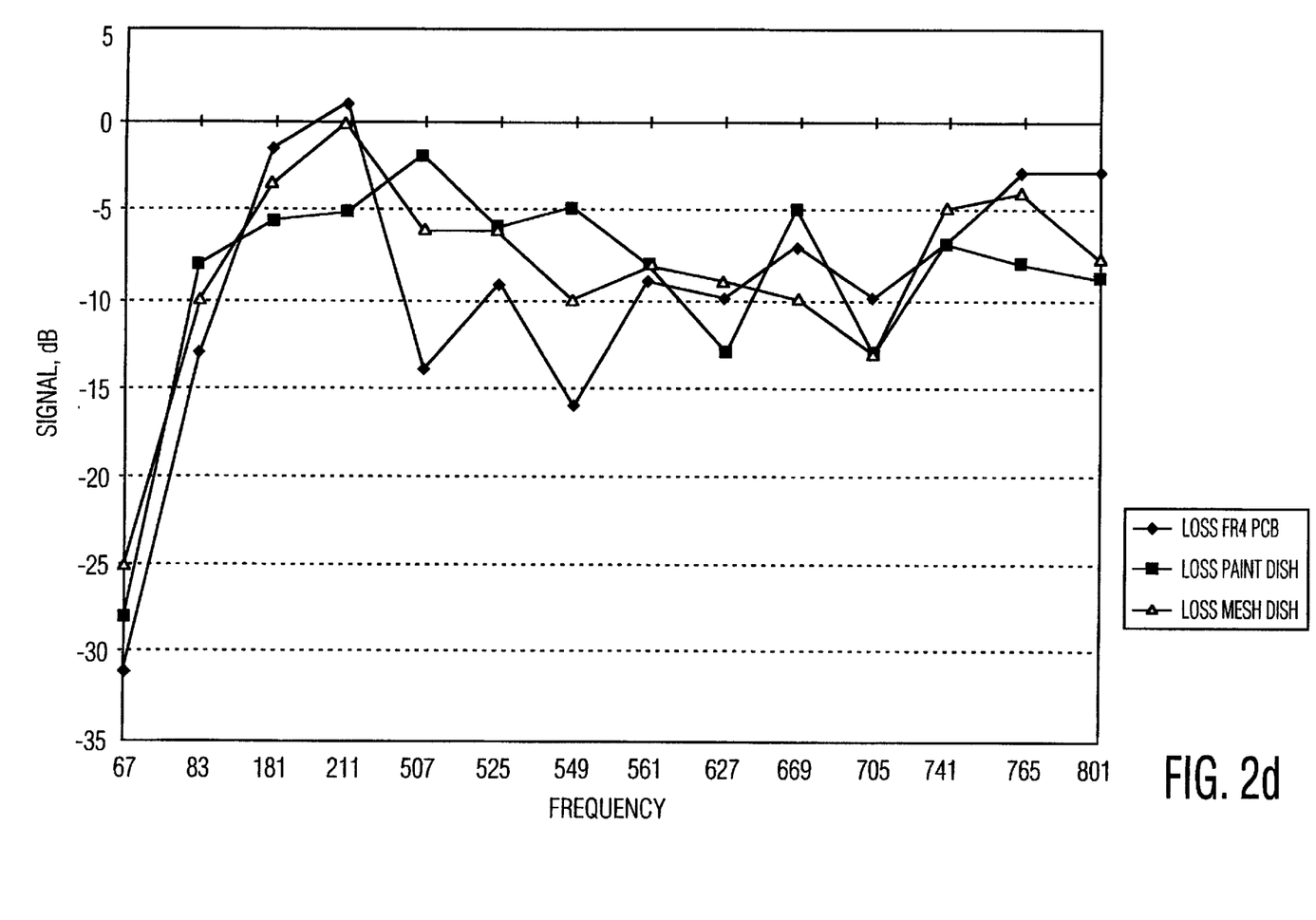

Another aspect of the invention involves the structure of the VHF/UHF antenna element. The structure is depicted in FIG. 2-*a* and is referred to hereinafter as a "Folded Bow-Tie" antenna. It has been found that the does not require adjustment for receiving television broadcast signals throughout the entire VHF and UHF television bands of frequencies (54–870 MHz in the U.S.). This is because the Folded Bow-Tie antenna exhibits a wide frequency bandwidth, which well extends to the lower edge of the VHF low-band broadcast television frequencies (54 MHz). It is known, for example, from *Antennas* by John D. Kraus (see e.g., pp. 340–358 McGraw Hill, 2nd Edition, 1988) that a bow-tie-shaped biconical antenna has a relatively wider frequency bandwidth than a classic dipole antenna. FIG. 2*d* shows experimental results indicating that the Folded Bow-Tie antenna features a significantly wider bandwidth than conventional designs such as a bow-tie-shaped biconical antenna or a folded-dipole antenna.

As described above, a Folded Bow-Tie antenna can easily be formed on a dish-shaped reflector by utilizing the injection molding process. This is desirable for mass production of the dual-purpose antennas. In addition, the cost for providing the VHF/UHF antenna is significantly reduced in comparison with providing a separate antenna assembly that is attachable to the dish assembly. Physical dimensions of an exemplary Folded Bow-Tie antenna have been determined experimentally and are shown in FIG. 2-*a*. In particular, for a dish antenna 100 having a width of 18 inches (46 cm), the length 220 of the Folded Bow-Tie antenna element is 18 inches (46 cm) and the width 210 is 9 inches (23 cm).

The conductive paint also contributes to the wide-band nature of the Folded Bow-Tie antenna on the dish. Any conductive paint is not perfectly conductive because of inherent resistance. For example, the Folded Bow-Tie antenna made of nickel paint on an 18-inch (46 cm) diameter dish has a total resistance of approximately 17 ohms. It might appear that this resistance would degrade the performance of the Folded Bow-Tie antenna because the resistance can weaken the received signals. However, such resistance could, in fact, enhance the overall performance of the Folded Bow-Tie antenna because the resistance provides better antenna impedance matching throughout the entire band of VHF/UHF television frequencies. The resistance functions as a broadband load for the antenna. Improvement provided by better impedance matching of the antenna exceeds the signal loss caused by the resistance. The compromise between the signal loss and the impedance matching could be optimized by varying the resistivity of the conductive paint.

If a larger dish reflector is used, further improvement in VHF/UHF reception can be obtained by using an array of Folded Bow-Tie antenna elements. For example, a dish of larger than 18 inches in size could be used such that two Folded Bow-Tie antenna elements of the size described in regard to FIG. 2-*a* could be arranged in a vertically stacked array as shown in FIG. 2-*b*. Electrically integrating the signals received from the multiple elements would provide an additional 3 dB gain.

In FIG. 2-*a*, the elements of Folded Bow-Tie Antenna 230 are divided from center feed points 13 and 14 to respective ends 15 and 16 which coincide substantially with the outer edge of reflector 100. The two elements are connected on side 17. On the other side, the two elements are separated at respective feed points 13 and 14.

Figure 3:
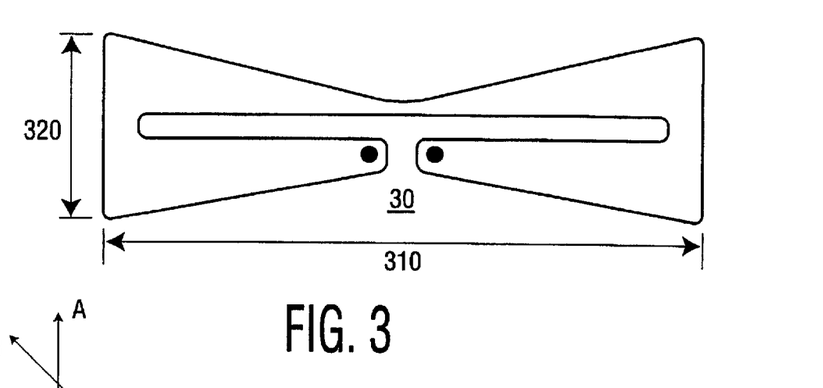
FIG. 3 illustrates a stand-alone Folded Bow-Tie antenna.

In addition to being formed in the surface of dish 100 in FIG. 1 and 2-*a*, a Folded Bow Tie antenna structure can be designed as a stand-alone antenna as shown in FIG. 3. For a stand-alone type antenna, it is preferable to make the antenna smaller than the above-described embodiment formed on an 18 inch (46 cm) dish because a smaller antenna can easily be placed in many different locations. FIG. 3 illustrates an embodiment of a smaller Folded Bow- Tie antenna 30 which is a compromise between function and size. Experimental results have proven that acceptable performance is obtained when antenna 30 is 18 inches (46 cm) in length and 4 inches (10 cm) in width. The elements of antenna 30 can be constructed by using various techniques such as etching the antenna structure on a conventional circuit board or taping aluminum or copper foils onto a non-conductive sheet of substrate material. For the reception of television and other broadcast signals, it is preferable to make an antenna operate with some degree of directivity. This is because a directional antenna provides not only greater signal magnitude but also rejects undesirable multi-path signals and other interferences. The Folded Bow Tie antenna has a "figure eight" antenna pattern.

For optimum VHF/UHF reception, as illustrated in FIG. 2-*c*, the antenna should be positioned such that a lobe of the pattern is pointed toward the VHF/UHF television transmitting antenna. One way to point the antenna toward a plurality of transmitting antennas is to rotate the antenna mechanically. However, if the Folded Bow-Tie antenna is incorporated with the dish reflector as shown in FIG. 1 and FIG. 2-*a*, physically rotating the antenna is undesirable because an antenna for receiving DBS signals is typically fixed in a position that aims toward a particular satellite. In addition, physically rotating an antenna involves significant additional cost for rotating devices. Moreover, it would take around 10–20 seconds to rotate the antenna from one direction to the opposite (i.e., 90 degrees). Antenna adjustment might be needed to find the optimum direction of the antenna whenever a user changes channels.

Figure 4:
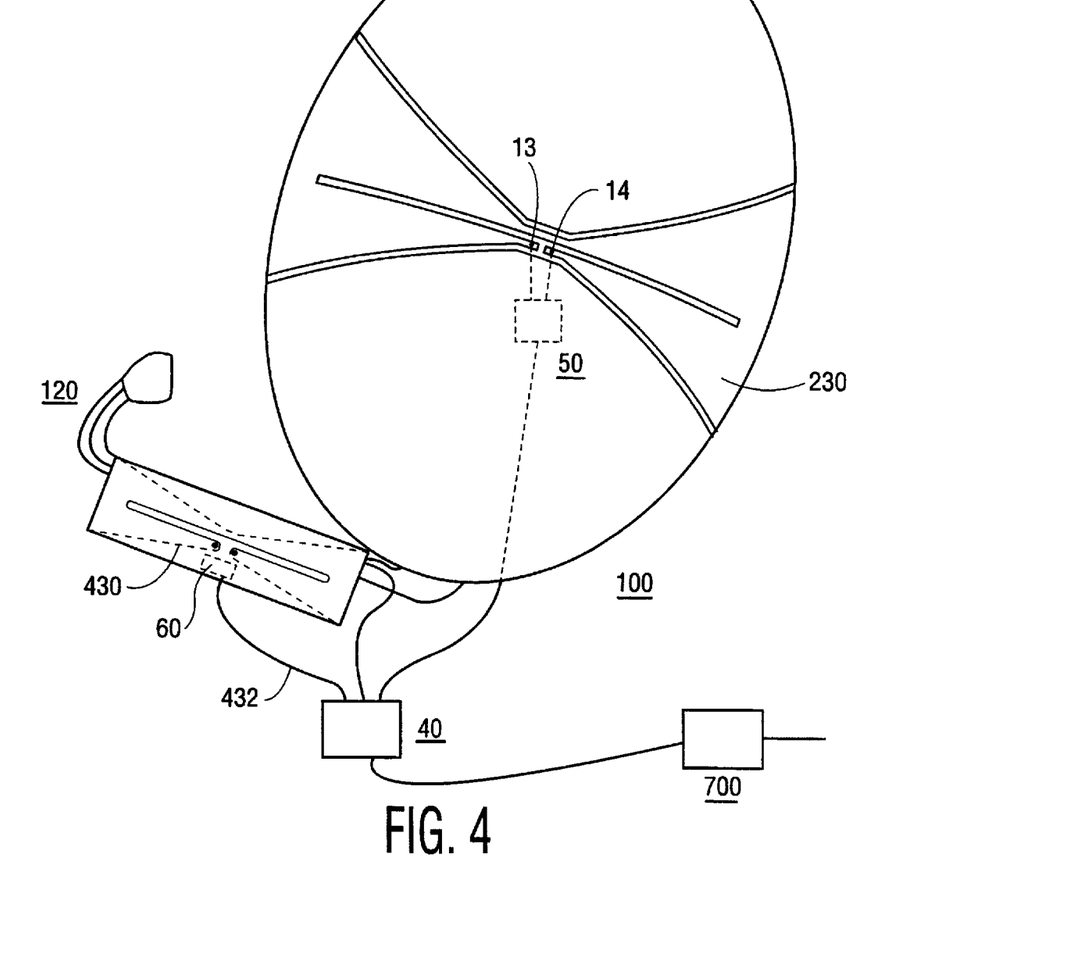
FIG. 4 illustrates another embodiment of a dual-purpose antenna system incorporating features shown in FIG. 1 and FIG. 3.

Another aspect of the invention eliminates the need to rotate the antenna by providing a switchable Folded Bow-Tie antenna system. As shown in FIG. 4, a switchable Folded Bow-Tie antenna system includes an orthogonal combination of two Folded Bow-Tie antennas. Smaller size Folded Bow-Tie antenna 430 is installed under frequency converter supporting arm 120. Three output signals (i.e., output of smaller Folded Bow-Tie antenna 430, output of Folded Bow-Tie antenna 230 on the dish, and output of frequency converter 11) are applied to switch/amplifier 40 separately. Two 4:1 balun transformers 50, 60 are provided for the respective two Folded-Bow-Tie antennas for impedance matching purposes. The terminals for feed points 13, 14 are located on the back of reflector 10, and balun transformer 50 is attached underneath the dish. In response to a control signal generated by control circuit 60, switch/amplifier 40 selects the output signal from the Folded Bow-Tie antenna that is pointed toward a desired VHF/UHF transmitting antenna. Control of the switching operation is described in more detail below.

A single coaxial cable can carry a plurality of different signals such as (1) down-converted microwave signals; (2) VHF/UHF broadcast signals; (3) DC power for frequency converter 11 as well as for switch/amplifier 40; and (4) a switching control signal for switch/amplifier 40. This allows a simple installation of the entire dual-purpose antenna system. Exemplary wiring connections are shown in FIG. 4.

Figure 5:
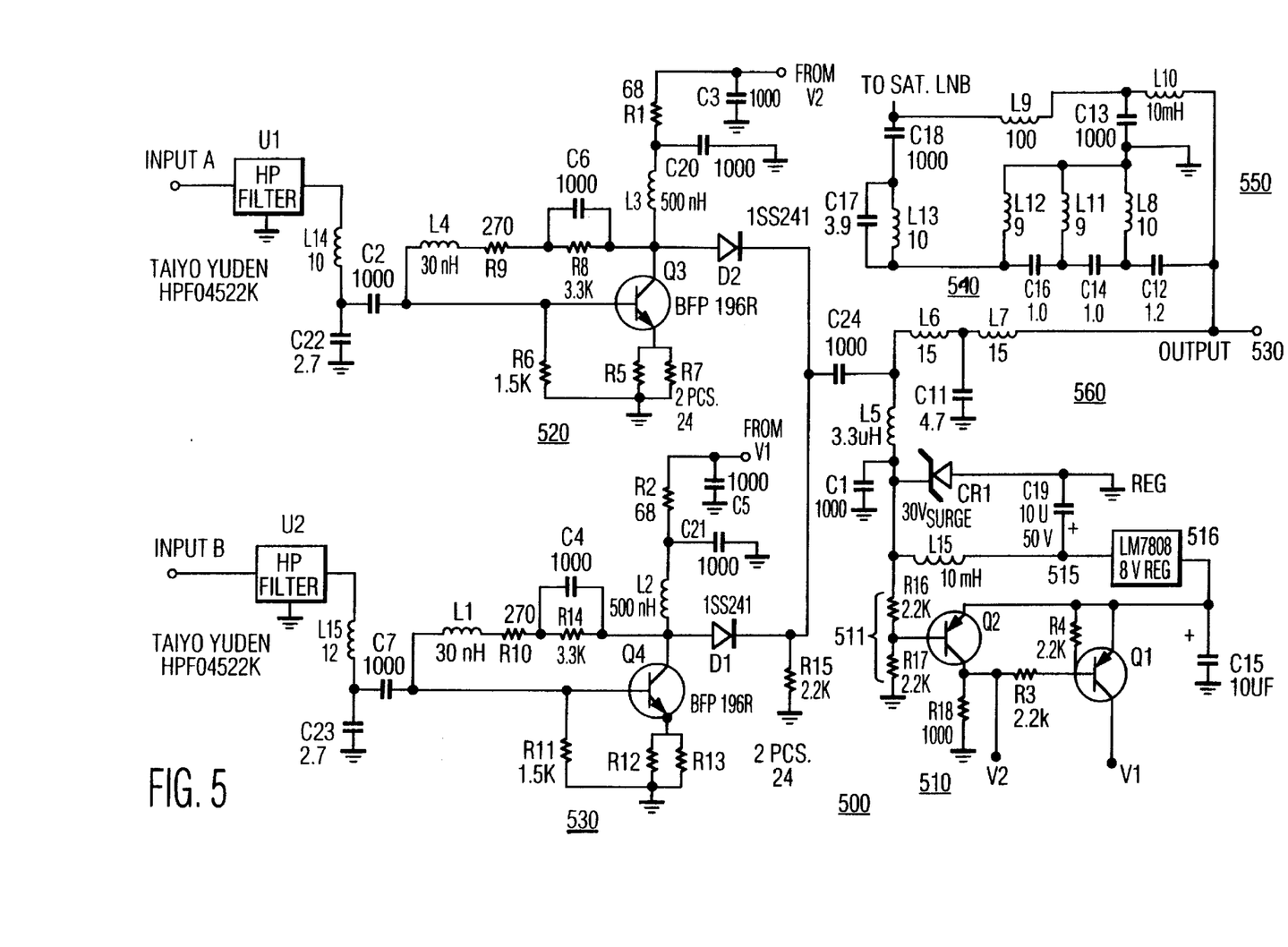
FIG. 5 shows, in schematic diagram form, an embodiment of a voltage-controlled antenna switch/amplifier.
Figure 6:
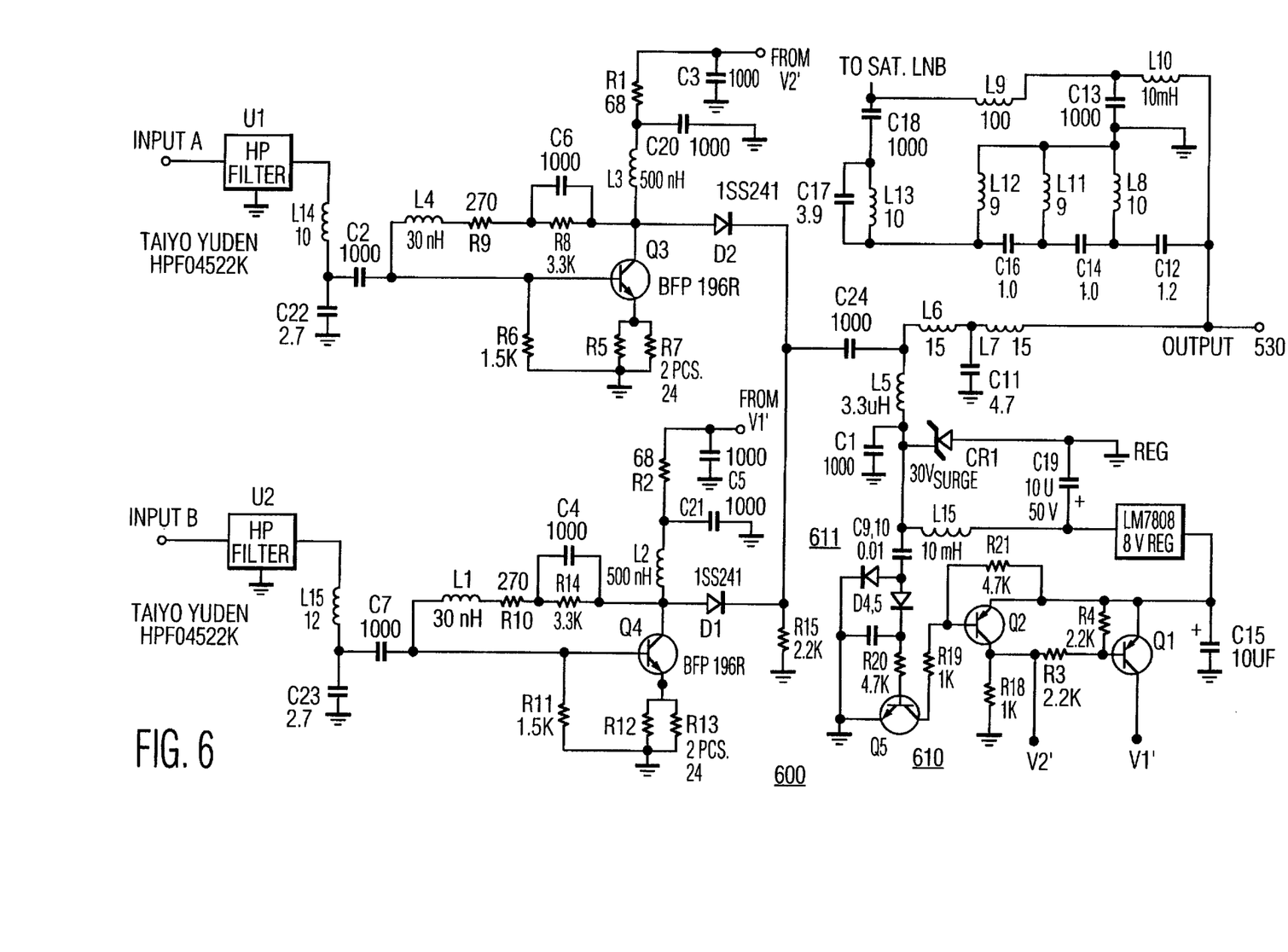
FIG. 6 shows, in schematic diagram form, an embodiment of a tone-controlled antenna switch/amplifier.

FIG. 5 shows an exemplary circuit 500 for switch/amplifier 40 in the form of a schematic diagram. Switch/amplifier 500 includes amplifiers 520, 530; switching circuits D1, D2; switching control circuit 510; and diplex filters 560. As described below, switching operation in the circuit in FIG. 5 is controlled by a DC level. FIG. 6 shows another exemplary circuit 600 which is responsive to an AC switching control signal, e.g., a 22 kHz signal, as described below. Either embodiment of switch/amplifier 40 provides very fast selection between Folded Bow-Tie antennas 230, 430.

In FIG. 5, two identical amplifiers 520, 530 include transistors Q3 and Q4. Each of the amplifiers provides approximately 10 dB of gain. Conventional computer analysis and design techniques can be used to adjust gain, input and output impedance over the VHF/UHF television bands of frequencies (54 to 870 MHz). Input filters, U1 and U2, reject potential interference below 55 MHz. The switching is accomplished by PIN diodes D1 and D2 in response to alternately applying power to each amplifier 520 and 530. Switching voltage supply circuit 510 is arranged in such a way that when node V2 is at 8 volts, node V1 becomes zero volts. Accordingly, when node V2 is 8 volts, the collector of transistor Q3 (i.e., the anode of PIN diode D2) becomes 5 volts due to R1, and that of transistor Q4 (the anode electrode of PIN diode D1) becomes zero volts. This forward biases PIN diode D2 to a conductive state for RF signals. Therefore, the amplified signals from input A are directed to output terminal 530. On the other hand, D1 is reverse biased and blocks the signals from input B. Further, since no supply voltage is applied to transistor Q4, amplifier 530 does not provide any positive gain to the signals from input B and, in fact, attenuates the signal which further isolates input B from output terminal 530. Alternatively, when node V2 is zero volts, node V1 becomes 8 volts. Under such circumstances, the foregoing operation will be reversed, and the signals from input B are amplified and directed to output terminal 530.

As mentioned above, a DC power supply circuit in a television system (e.g, a satellite tuner or a television receiver) could supply a DC power voltage for switch/amplifier 40 via the center conductor of a coaxial cable. In the exemplary embodiments shown in FIGS. 5 and 6, such a DC power voltage (for example, between 10 and 25 volts) is separated from VHF/UHF broadcast signals by inductor L5 and supplied to input 515 of regulator. REG. Regulator REG provides a regulated DC power voltage (e.g., 8 volts) for the entire switch/amplifier circuitry.

In response to antenna switching control information (i.e., variation of the DC power voltage) transmitted from the television system as described in more detail below, control circuit 510 provides different DC bias voltages for PIN diodes D1, D2 respectively. The DC power voltage from the television system is supplied not only to the input of regulator REG but also to the base electrode of transistor Q2 via voltage divider 511 which includes resistors R16, R17. The regulated DC power voltage is applied to the emitter electrode of transistor Q2. When the television system sends a lower DC power voltage (e.g., below 14.8 volts), voltage divider 511 provides a lower bias voltage (e.g., below 7.4 volts) for the base electrode of transistor Q2 so that transistor Q2 becomes turned on (i.e., conductive). Thus, the regulated power voltage appears at node V2 and forward biases PIN diode D2. On the other hand, Q1 becomes turned off (i.e., non-conductive), and node V1 become zero volts. Thus, no power is supplied to both amplifier 530 and diode D1. It is noted that resistor R18 provides a base current for Q1 to assure that Q1 is completely turned on when Q2 is turned off. For a higher DC power voltage (e.g., above 14.8), Q2 becomes non-conductive and Q1 becomes conductive. Resistor R18 is added to provide stability for control circuit 510 near its threshold level (e.g., 14.8 volts).

Diplex filter 560 includes low pass filter 540 and high pass filter 550. Diplex filter 560 is designed to combine the VHF/UHF broadcast signals (55 to 803 MHz) and the converted microwave signals (950 to 1450 MHz) so that they can be transmitted via the same center conductor of a single coaxial cable. More specifically, low-pass filter 540 for the VHF/UHF broadcast signals (with a cut-off frequency of, for example, 803 MHz) includes inductance L6, L7, and capacitance C11. High-pass filter 550 for the converted microwave signals (with a cut-off frequency of, for example, 950 MHz) includes inductance L8, capacitance C12, and C14. Inductance L9, L10 and capacitance C13 are provided for passing the DC power voltage to frequency converter 11.

FIG. 6 shows the schematic diagram for another exemplary embodiment of switch/amplifier 40. In this embodiment, an AC signal (e.g., 1.5 volt P—P at 22 kHz) is used to control the switching function of switch/amplifier 40. The tone signal is generated in the television system using conventional oscillator techniques and is applied to or removed from the center conductor of a coaxial cable. If the tone is present, the tone signal is applied to and rectified in tone switching circuit 610 which includes tone rectifying circuit of C9, D4, D5 and C10. The rectified tone signal turns both transistors Q5 and Q2 conductive. Thus the regulated DC voltage (e.g., 8 volts) is applied to node V2' via transistor Q2. On the other hand, transistor Q1 becomes non-conductive and node V1' becomes zero volts. This causes transistor Q3 and PIN diode D2 to conduct and cuts off transistor Q4 and PIN diode D1. Therefore, switch/amplifier circuit 600 selects input A.

Figure 7:
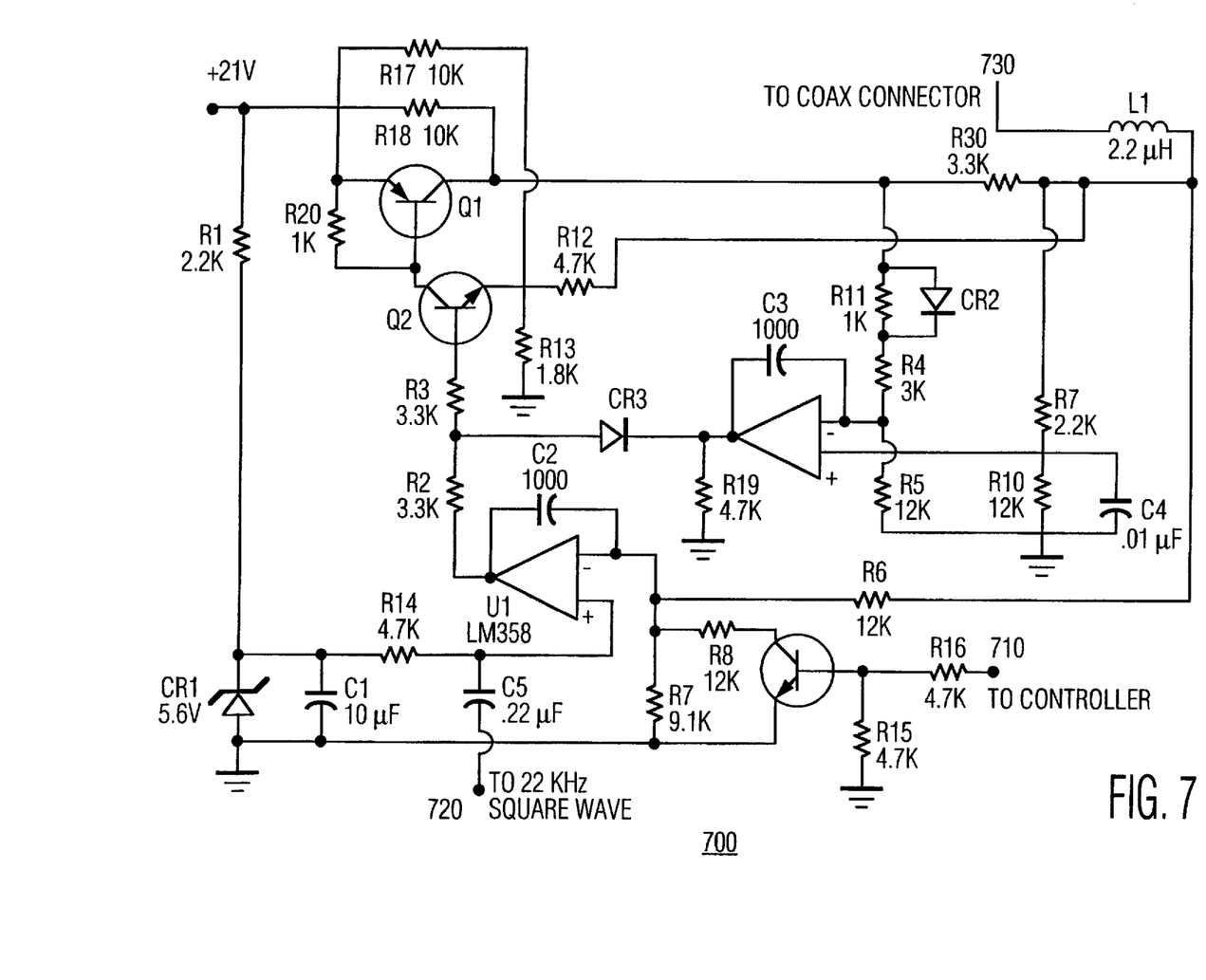
FIG. 7 shows, in schematic diagram form, an embodiment of a power supply regulator circuit for generating control signals for a frequency converter and an antenna switch/amplifier.
Figure 8:
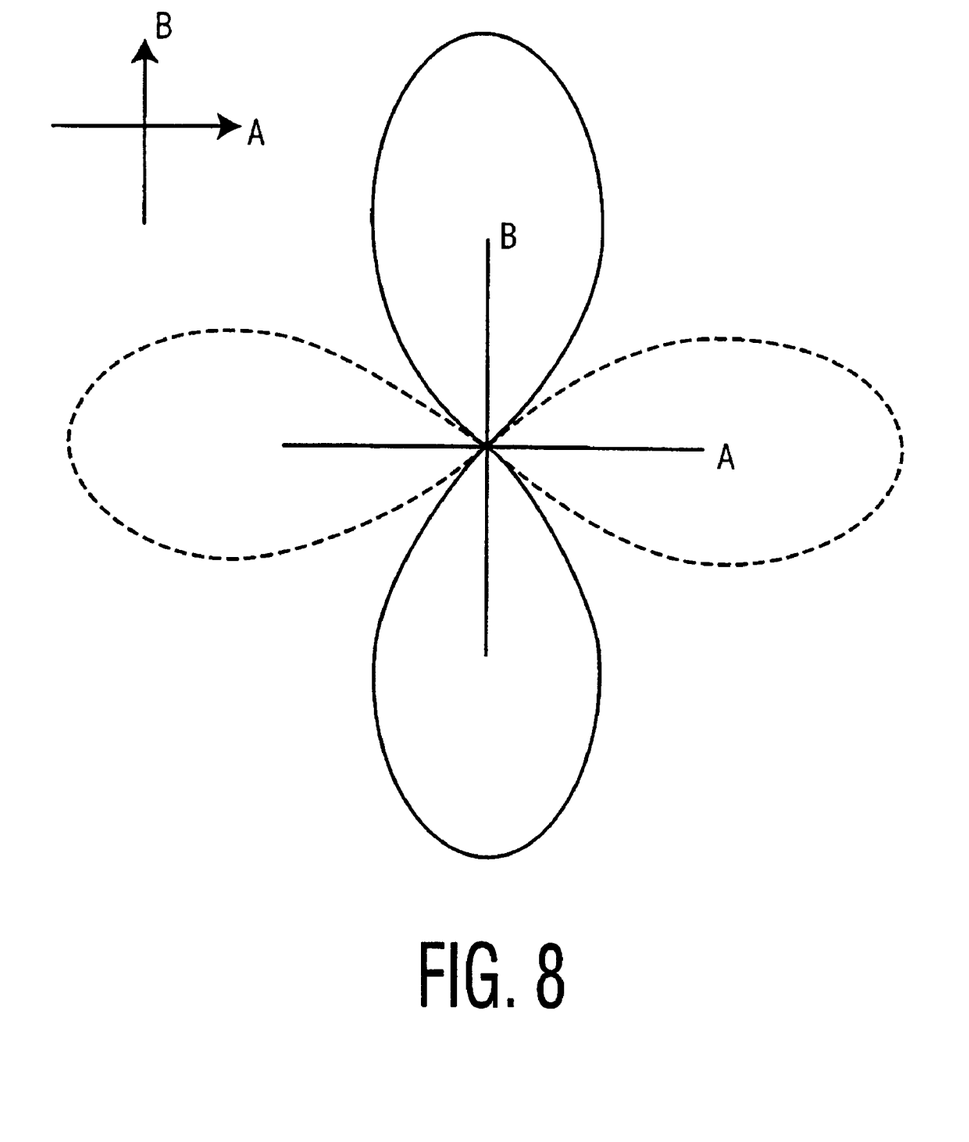
FIG. 8 illustrates an antenna pattern associated with a switched Folded Bow-Tie antenna.

FIG. 7 shows a DC power supply circuit 700 having a capability of adding a tone signal to the center conductor of a coaxial cable. This DC power supply circuit can be used in a television system (e.g., a satellite tuner or television receiver) for providing different DC supply voltages to a frequency converter such as converter 11 in FIG. 1 and 4. In addition, the voltages generated by the circuit in FIG. 7 may select the signal polarization (right hand or left hand circular polarization) that is received by converter 11. Also, the power supply circuit in FIG. 7 can provide DC power for switch/amplifier 600 shown in FIG. 6. Certain aspects of the circuit shown in FIG. 7 are known from U.S. Pat. Nos. 5,563,500 and 5,578,916. Other features of the circuit shown in FIG. 7 are described below.

In FIG. 7, a control signal having two control states is coupled to one terminal of resistor 710. Each control state causes the circuit in FIG. 7 to produce a different DC voltage at output terminal 730 in FIG. 7. For example, a control signal state of 0 V produces 13 V at terminal 730 while a control signal state of 5 V produces 17 V at terminal 730. Typically, output terminal 730 is coupled to a frequency converter or LNB such as converter 11 in FIG. 1 and 4 via the center conductor of coaxial cable. Each voltage causes converter 11 to receive a different signal polarization, e.g., 13 V causes the converter to receive right hand circularly polarized signals while 17 V causes the converter to receive left hand circularly polarized signals.

Also in FIG. 7, a 22 kHz "tone" signal is coupled via capacitor C5 to the positive input of amplifier U1. When the 22 kHz tone signal is present, amplifier U1 and transistors Q1 and Q2 couple the 22 kHz signal to the output signal at terminal 730. The circuit operation is such that signal at terminal 730 includes both the 22 kHz signal, when present, and the selected DC level (e.g., 13 V or 17 V). The presence or absence of the tone signal in the output signal is detected by the switching circuit in FIG. 6 and used to switch between Folded Bow-Tie antenna input signals. Thus, the circuit in FIG. 7 produces an output signal at terminal 730 that combines AC and DC control signals for independently controlling signal polarization and antenna switching. In addition, the DC voltage provided at terminal 730 is used to power the switching amplifier in FIG. 6.

The particular state of the control signal and the presence or absence of the 22 kHz tone is determined by a control device in the television system, such as a microcontroller (not shown in FIG. 7). As an example, a user activates a particular key on a remote control to select a particular signal polarization or to initiate switching between Folded Bow-Tie antennas. Activation of the key generates a remote control signal that is received by the microcontroller. The microcontroller processes the remote control signal to select the appropriate function. For example, the microcontroller generates the appropriate state of the control signal supplied to resistor R16 in FIG. 7 or controls a switch to couple (or decouple) the 22 kHz signal to capacitor C5.

It is noted that the switching operation of switch/amplifier 40 can be initiated in several different ways. For example, a user can manually select one of the Folded Bow-Tie antennas one channel after another by using a remote controller. Second, this selection can be done automatically with a microcomputer system which includes memory wherein information on channels coupled to the respective antenna selections is stored. Once the user selects either one of the antennas for a particular broadcast television channel, the same antenna will automatically be selected again when he chooses the same channel later. Third, the microcomputer system can also automatically select the better VHF/UHF antenna by measuring the automatic gain control (AGC) signal which indicates the level of the received VHF/UHF television signals. This automatic selection may be done during the so-called "autoprogram" operation of a television receiver. Preferably, this selection can be modified later manually by the user if necessary. The foregoing automatic antenna selection methods would benefit the user by allowing rapid channel selection, sometimes called "channel surfing."

FIG. 7 illustrates an antenna pattern of a pair of switched orthogonal Folded Bow Tie antennas. The dotted line represents the pattern of antenna 230 on the dish, and the solid line represents that of antenna 430 mounted under frequency converter supporting arm 120 shown in FIG. 4. It has been determined that half of the potential multipath and interferences may be removed by switching two Folded Bow Tie antennas in comparison with an omnidirectional antenna (i.e., an antenna having 360 degree coverage).

Figure 9A:
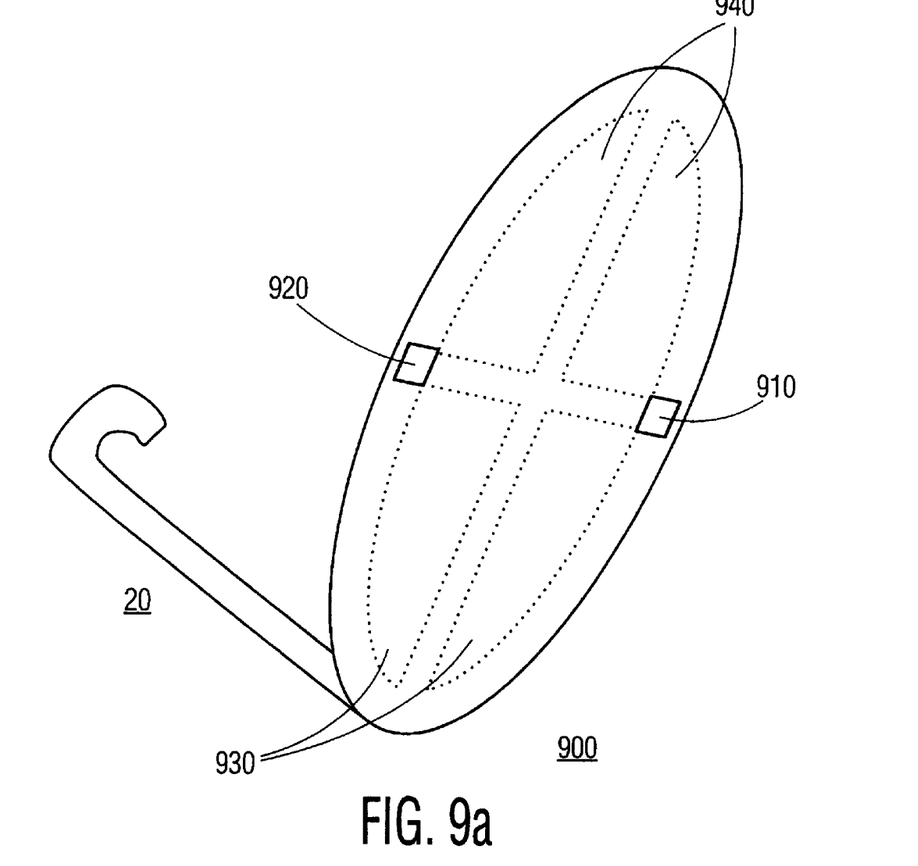

FIG. 9-*a* illustrates another embodiment of the dual-purpose antenna. In FIG. 9-*a*, a conductive screen is embedded in an insulating molding compound (e.g., plastic) to form dish-shaped reflector 800. The screen is not capable of being easily formed to the folded bow-tie shape, so a simpler shape should be used. A preferable implementation of the screen is to divide the screen into two parts with a minimum separation gap less than one eighth inch (3.0 mm) as discussed above. The divided conductive screen is still capable of reflecting microwave signals, and divided parts form dipole type VHF and UHF antennas respectively. These shapes could also be formed with conductive paint as before.

Figure 9B:
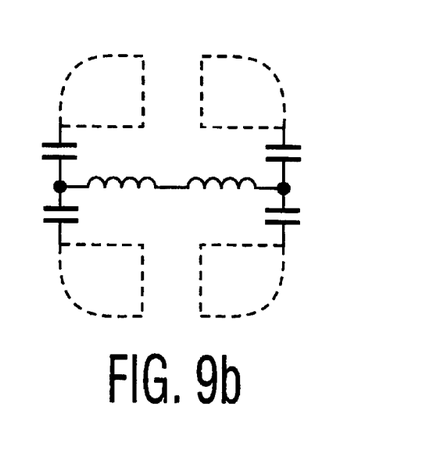

In FIG. 9-*a*, the conductive screens are divided horizontally as well as vertically. Lower section 930 of the screens is designed to operate as an UHF dipole-type antenna for the optimum UHF reception, and upper section 940 in combination with lower section 930 provides a VHF antenna. Lower section 930 is RF coupled, within the VHF television frequencies, to upper section 940 for the optimum VHF reception. Radio frequency (RF) filters 910, 920 are used as coupling means. Each one of the filters may be a simple parallel resonant trap similar to that used for amateur radio dipole antennas or simply a high pass filter as shown in FIG. 9-*b*. This variation can also be formed with conductive paint. Some of the RF filtering can be developed by masking the conductive paint on the dish.

Figure 10:
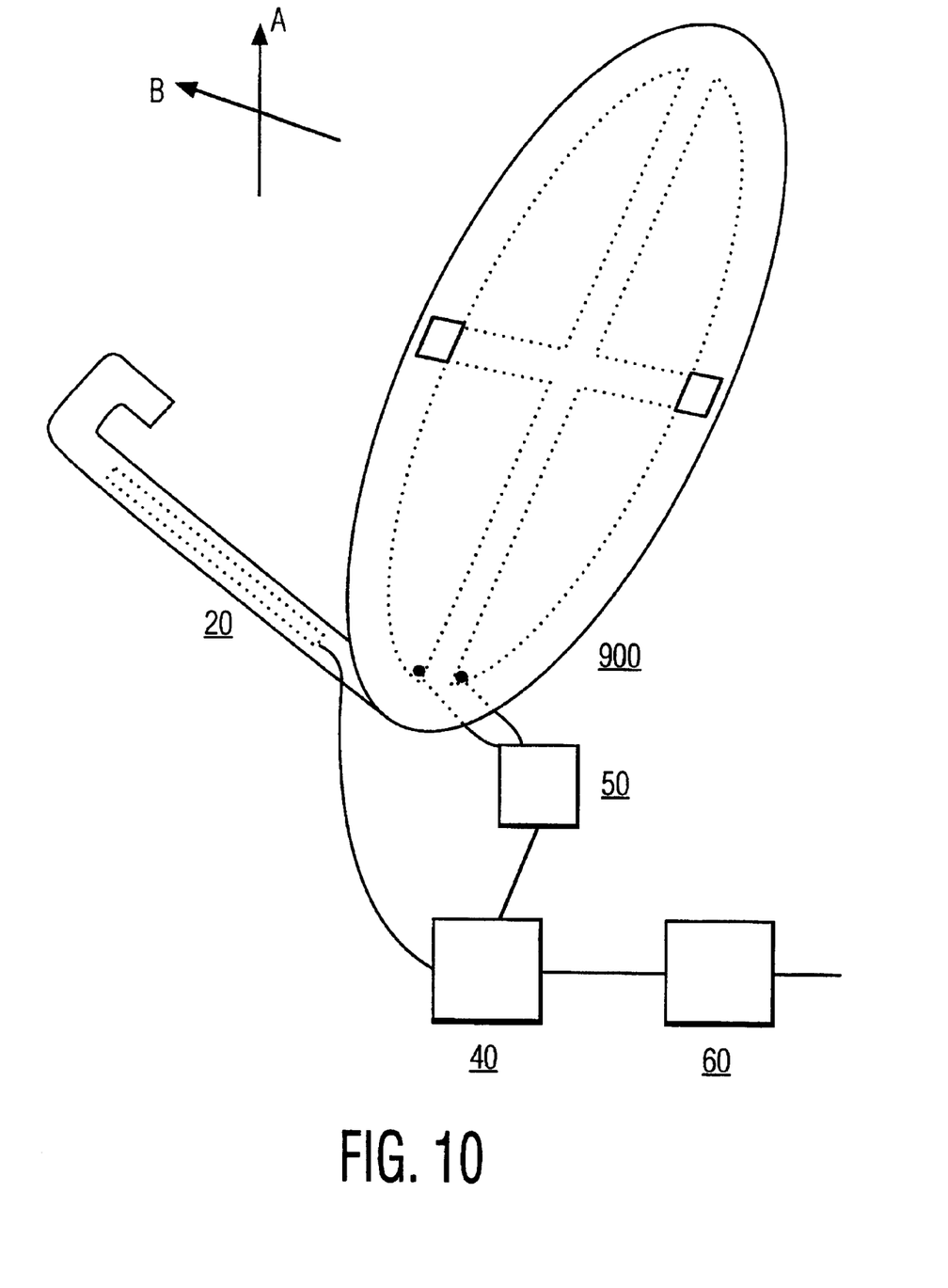
FIG. 10 illustrates another embodiment of a dual-purpose antenna system including features shown in FIG. 9-a.

FIG. 10 illustrates an exemplary antenna system for a conductive mesh type reflector. The output of the dipole-type antenna in the dish may be coupled to a balun transformer and then one of the inputs of a diplex filter, such as the Channel Master model 4001 IFD. The other input of the diplex filter may also be coupled to the output of the frequency converter to receive microwave broadcast signals from a satellite. The combined output of the diplex filter may be coupled to a television system via a single coaxial cable (instead of two). Here another diplex filter may separate the VHF/UHF and satellite signals from the combined signals so that a conventional VHF/UHF television receiver and a satellite tuner are able to receive the two separated signals respectively.

Figure 11A:
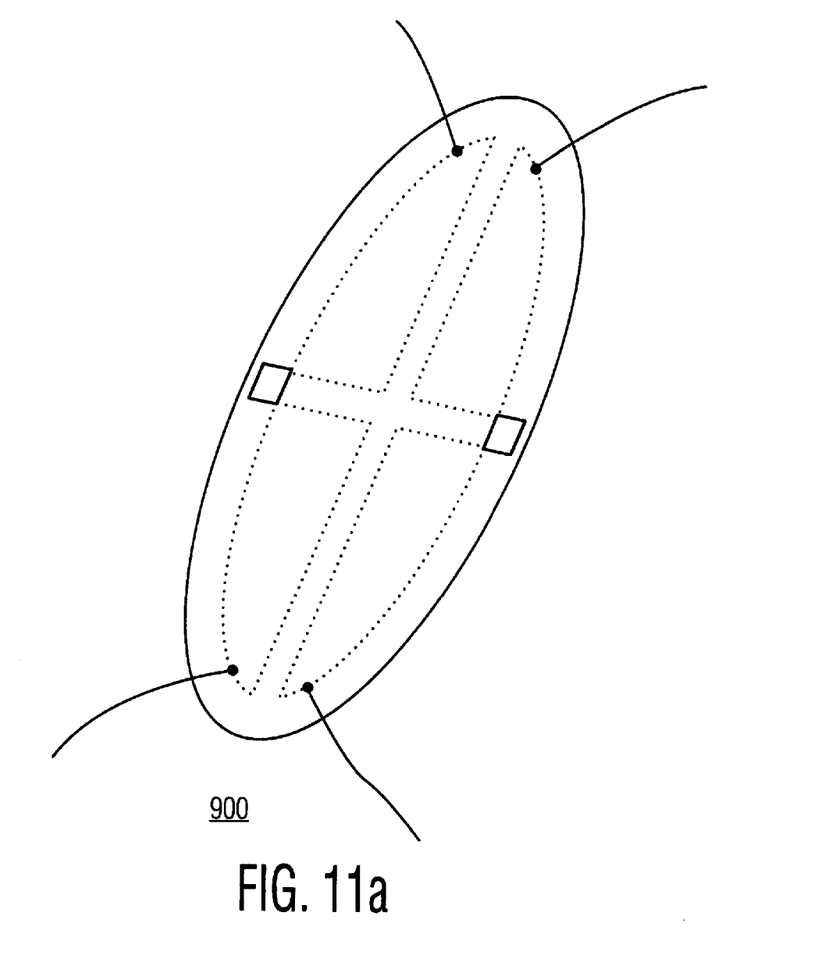

It has been found that the embodiment of the VHF/UHF reception system shown in FIG. 10 provides good signal reception in areas where broadcast stations are located nearby (for example, within 20 miles). Further improvement of VHF/UHF reception can be accomplished by attaching radial rods to portions of the screen assembly as shown in FIG. 11-*a*. The radial rods make the embedded dipole-type antenna function similar to a biconical antenna.

Figure 11B:
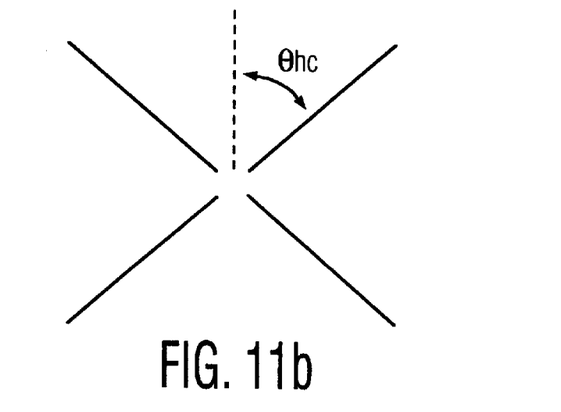

A uniform input impedance (Ri) of an "infinite" biconical antenna is given by $Ri = 120 \ln \cot \Theta_{hc}/2$ (Ohm)

where $J_{hc}$ is as shown in FIG. 11-*b*. For a finite biconical antenna, in which the length of the antenna element is less than one wavelength of the receiving frequency, the input antenna impedance becomes reactive. Thus, it may be desirable to increase the effective length of the "cone" section (i.e., screen). The rods or wires may be added extending radially from the back of the antenna. These rods can be at an angle $J_{hc}$ as shown in FIG. 11-*b* to control the input impedance of the antenna as well as to improve especially reception of the lower frequency signals within the VHF/UHF broadcast band of frequencies.

A recent development of technology for NTSC reception, known as "programmable digital equalizer," is advantageous especially for improving the dual purpose antenna system. This is because the equalizer could further reduce the multipath and interference problems for the NTSC local broadcast signals.

Although the present invention has been described with a certain degree of particularity, it is understood that the present disclosure has been made by way of examples and that changes in details of structure may be made without departing from the spirit the invention. For example, the dual-purpose antenna can be used not only for receiving digital/analog television signals but also for receiving digital/analog audio or data signals.

What is claimed is:

1. An electromagnetic signal reflector comprising:

a reflective element for reflecting and focusing electromagnetic signals in a first band of frequencies; and an antenna element which operates as part of said reflective element for receiving electromagnetic signals in a second band of frequencies and simultaneously reflecting electromagnetic signals in said first band of frequencies.

2. The electromagnetic signal reflector of claim 1 wherein:

said reflective element includes a reflective material which reflects electromagnetic signals in said first band of frequencies and which forms said antenna element.

3. The electromagnetic signal reflector of claim 2 further comprising:

antenna elements coupled to said antenna element extending outwardly from the fringe of said reflective element.

4. The electromagnetic signal reflector of claim 2 wherein:

part of said reflective material forms said antenna element and said antenna element is separated from the rest of said reflective material by a non-conductive gap which width is less than one-eighth of the wavelength of an electromagnetic signal in said first band of frequencies.

5. The electromagnetic signal reflector of claim 4 wherein:

said reflective material adheres to a surface of said reflective element.

6. The electromagnetic signal reflector of claim 5 wherein:

part of said rest of said reflective material forms impedance transforming means.

7. The electromagnetic signal reflector of claim 5 wherein:

part of said rest of said reflective material forms coupling means.

8. The electromagnetic signal reflector of claim 5 wherein:

a first part of said rest of said reflective material forms impedance transforming means; and a second part of said rest of said reflective material forms coupling means.

9. The electromagnetic signal reflector of claim 4 wherein:

said reflective material is embedded in the body of said reflective element.

10. An apparatus for receiving electromagnetic signals in first and second bands of frequencies comprising:

a reflective element for reflecting and focusing electromagnetic signals in said first band of frequencies;

a horn receiving said electromagnetic signals in said first band of frequencies at a focused point;

feed mount means for positioning said horn at said focused point;

an antenna element which operates as part of said reflective element for receiving electromagnetic signals in said second band of frequencies and simultaneously reflecting electromagnetic signals in said first band of frequencies.

* * * * *

UNITED STATES PATENT AND TRADEMARK OFFICE
CERTIFICATE OF CORRECTION

PATENT NO. : 6,166,703
DATED : December 26, 2000
INVENTOR(S) : Muterspaugh

It is certified that error appears in the above-identified patent and that said Letters Patent is hereby corrected as shown below:

References cited on INFORMATION DISCLOSURE STATEMENT UNDER 37CFR 1.97 of July 30, 1998 NOT printed on face of patent despite having been considered by the Examiner.

| | | | | |
|---|---|---|---|---|
| AA | 4,328,500 | 5/4/82 | Alia et al. | 343/700 |
| AB | 4,864,314 | 9/5/89 | Bond | 343/700 MS |
| AC | 4,284,991 | 8/18/81 | Dupressoir | 343/725 |
| AD | 3,445,850 | 5/20/69 | Stegen | 343/727 |
| AE | 4,095,230 | 6/13/78 | Salmond et al. | 343/729 |
| AF | 2474770 | 7/31/81 | France | |

Signed and Sealed this

Sixteenth Day of October, 2001

Attest:

NICHOLAS P. GODICI
Acting Director of the United States Patent and Trademark Office Attesting Officer